United States Patent [19]
Smith et al.

[11] Patent Number: 5,928,517
[45] Date of Patent: Jul. 27, 1999

[54] WATER-SOLUBLE POLYMERS FOR RECOVERY OF METALS FROM SOLIDS

[75] Inventors: Barbara F. Smith; Thomas W. Robison; Nancy N. Sauer; Deborah S. Ehler, all of Los Alamos, N.Mex.

[73] Assignee: The Regents of the University of California, Los Alamos, N.Mex.

[21] Appl. No.: 08/453,596

[22] Filed: May 30, 1995

[51] Int. Cl.$^6$ .............................. B01D 61/14; C02F 1/54
[52] U.S. Cl. ........................ 210/650; 210/651; 210/711; 210/712; 210/732; 210/751; 210/912; 210/913; 210/914; 134/10; 134/25.1
[58] Field of Search ..................... 210/688, 698, 210/701, 650, 751, 712, 912, 651, 913, 914, 711, 732; 134/10, 25.1; 405/128, 129

[56] References Cited

U.S. PATENT DOCUMENTS

| | | | |
|---|---|---|---|
| 4,731,187 | 3/1988 | Moriya et al. | 210/719 |
| 4,741,831 | 5/1988 | Grinstead | 210/638 |
| 4,963,264 | 10/1990 | Davis | 210/638 |
| 5,176,834 | 1/1993 | Christian et al. | 210/639 |
| 5,262,024 | 11/1993 | Lomasney et al. . | |
| 5,347,071 | 9/1994 | Moriya et al. | 588/256 |
| 5,387,365 | 2/1995 | Moriya et al. | 252/180 |
| 5,395,896 | 3/1995 | Moriya et al. . | |
| 5,411,667 | 5/1995 | Hiratani et al. | 210/638 |

FOREIGN PATENT DOCUMENTS

| | | | |
|---|---|---|---|
| 0437851A1 | 12/1990 | European Pat. Off. | B01J 45/00 |
| 1466150 | 12/1973 | United Kingdom | B01D 13/00 |

OTHER PUBLICATIONS

Geckler et al., "Removal of Hazardous Substances from Water using Ultraltration in Conjunction with Soluble Polymers", Environmental Science & Technology, vol. 30, No. 3, pp. 725–734 (1996).

Geckler et al., "Preparation and Application of Water–Soluble Polymer–Metal Complexes", Pure & Applied Chem., vol. 52, pp. 1883–1905 (1980).

Volchek et al., "Polymer binding/ultrafiltration as a method for concentration and separation of metals", J. of Membrane Sci., vol. 79, pp. 253–272 (1993).

H. Strathmann, "Selective Removal of Heavy Metal Ions from Aqueous Solutions by Diafiltration of Macromolecular Complexes", Separation Science & Technology, 15(4), 1980, pp. 1135–1152.

E. Bayer et al., "Soluble Polychelatogenes for Separation of Actinide Ions by Membrane Filtration", Israel Journal of Chemistry, 1985, vol. 26, pp. 40–47.

S. Kobayashi et al., Phosphonomethylated Polyethylenimine Resin for Recovery of Uranium from Seawater, Polymer Bulletin, 1986, vol. 15, pp. 7–12.

K. E. Geckeler et al., Liquid–Phase Polymer–Based Retention, A New Method for Separation and Preconcentration of Elements, Analytica Chimica Acta, 1986, pp. 285–292.

V. A. Kichik et al., Method for Reprocessing Liquid Radioactive Wastes, Combining Selective Selective Complexing and ultrafiltration, translation from Atomnaya Energiya, vol. 58, No. 4, pp. 272–273 (Apr. 1985) by Plenum Publishing Corporation, 1985, pp. 315–317.

Ye. Ye. Yergozhin et al., 8–Hydroxyquinoline–Based, Soluble, and Chelate Forming Ion Exchangers and Some of Their Physical and Chemical Properties, Polymer Science U.S.S.R. vol. 21, pp. 2225–2233 (1980).

(List continued on next page.)

*Primary Examiner*—Robert J. Popovics
*Attorney, Agent, or Firm*—Bruce H. Cottrell

[57] ABSTRACT

A process of selectively separating a target metal contained in a solid matrix from the solid matrix by contacting a solid matrix containing a target metal with an aqueous solution including a water-soluble polymer adapted for complexation with the target metal for sufficient time whereby a water-soluble polymer-target metal complex is formed, and, separating the solution including the water-soluble polymer-target metal complex from the solid matrix is disclosed.

20 Claims, 1 Drawing Sheet

OTHER PUBLICATIONS

B. Y. Spivakov et al., Liquid–phase Polymer–Based Retention—the Separation of Metals by Ultrafiltration on Polychelatogens, Nature, 1985, vol. 315, pp. 313–315.

V. M. Shkinev et al., Determination of Trace Heavy Metals in Waters by Atomic–Absorption Spectrometry after Preconcentration by Liquid–Phase Polymer–Based Retention, Talanta, 1989, vol. 36, No. 8, pp. 861–863.

B. Chaufer et al., Removal of Metal Ions by Complexation–Ultrafiltration Using Water–Soluble Macromolecules, Nuclear and Chemical Waste Management, 1988, vol. 8, pp. 178–187.

M. Rumeau et al., Separation by Coupling Ultrafiltration and Complexation of Metallic Species with Industrial Water Soluble Polymers, Journal of Membrane Science, 1992, vol. 73, pp. 313–322.

L. P. Buckley et al., Selective Removal of Dissolved Toxic Metals from Groundwater by Ultrafiltration in Combination with Chemical Treatment, Paper at HAZTECH International 89 Conference, Cincinnati, Ohio, Sep. 12–14, 1989.

V. T. Lee et al., Selective Removal of Dissolved Radioactivity from Aqueous Wastes by a Chemical Treatment/Ultrafiltration Technique, Paper No. S10b at International Conference on Separation Science and Technology, Hamilton, Canada, Oct. 1–4, 1989.

L. P. Buckley et al., The Removal of Soluble Toxic Metals from Water, paper at Annual Environmental Protection Agency (EPA) research symposium, Cincinnati, Ohio, Apr. 3–5, 1990.

EPA Technology Profile, "Atomic Energy of Canada LTD", Superfund Innovative Technology Evaluation, Nov. 1988, pp. 69–70.

WATER-SOLUBLE POLYMERS FOR RECOVERY OF METALS FROM SOLIDS

FIELD OF THE INVENTION

The present invention relates to water-soluble polymers and the use of such water-soluble polymers in selective removal and recovery of metals from solid matrices such as soil. This invention is the result of a contract with the Department of Energy (Contract No. W-7405-ENG-36).

BACKGROUND OF THE INVENTION

Water-soluble polymers are well known for the retention or recovery of certain metal ions from solutions under certain conditions, e.g., certain pH conditions (see, e.g., Pure and Applied Chemistry, Vol. 52, pp. 1883–1905 (1980), Talanta, vol. 36, No. 8, pp. 861–863 (1989), and U.S. Pat. No. 4,741,831). Additionally, higher molecular weight varieties of the water-soluble polymers such as polyethyleneimine have been used as coatings on, e.g., silica, for separation and recovery of metal ions.

Extraction or leaching of selected metals from a solid matrix, such as soil, with various extractants or leachants to recover the selected metals is well known, e.g., the use of cyanide in the mining industry. Such a process can involve placing soil onto an impermeable barrier layer and passing a leachant one or more times through the soil to remove one or more of the metals from the soil. The leachant typically binds with the metal, forming, e.g., a complex. The complex is ultimately separated from the soil, but the metal is not easily concentrated and the leachant is not easily recovered.

It is an object of the present invention to provide a process of separating target metals from a solid matrix such as a soil, an ore, mining tailings, a sludge, an ash, a paint, a catalyst matrix, a solid surface and the like.

It is a further object of the present invention to provide a process of selectively separating target metals from a solid matrix such as a soil, an ore, mining tailings, a sludge, an ash, a paint, a catalyst matrix, a solid surface and the like.

It is a still further object of the invention to provide a process of separating a contaminant metal from a solid matrix such as a soil, an ore, mining tailings, a sludge, an ash, a paint, a catalyst matrix, a solid surface and the like without the generation of significant additional waste.

Still a further object of the present invention is a process of separating a contaminant metal from a solid matrix such as a soil, an ore, mining tailings, a sludge, an ash, a paint, a catalyst matrix, a solid surface and the like whereafter the solid matrix can pass an EPA Toxicity Characteristic Leaching Procedure (TCLP) test for that contaminant metal.

Yet another object of the present invention is a process of separating a metal from a solid matrix such as a soil, a sludge, an ash, a paint, a catalyst matrix and the like using an extractant that can be readily regenerated after use without the generation of significant secondary waste streams.

SUMMARY OF THE INVENTION

To achieve the foregoing and other objects, and in accordance with the purposes of the present invention, as embodied and broadly described herein, the present invention provides a method of selectively separating a target metal contained in a solid matrix from the solid matrix including contacting a solid matrix containing a target metal with an aqueous solution including a water-soluble polymer capable of binding with the target metal such as lead, silver or cadmium under conditions and for sufficient time whereby a water soluble polymer-target metal complex is formed, and, separating the solution including the water-soluble polymer-target metal complex from the solid matrix.

DETAILED DESCRIPTION

Figure 1:
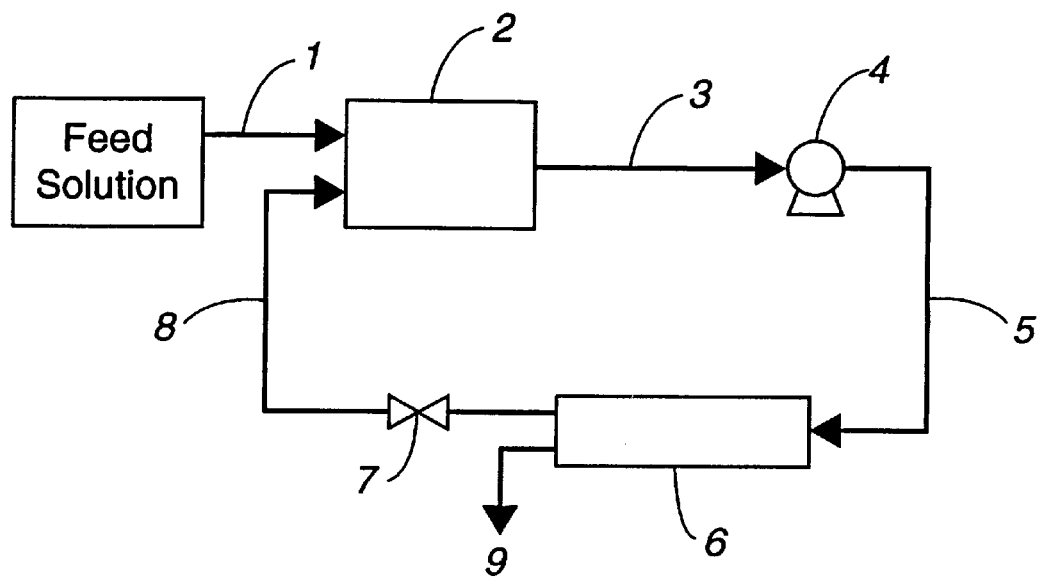
FIG. 1 illustrates a schematic diagram of an ultrafiltration process using a concentration mode of operation.

The present invention is concerned with separation and recovery of metals from solid matrixes. Among the solid matrixes contemplated in the present invention are included soils, mineral-containing ores, mine tailing piles, muds, sludges such as waste sludges, ashes such as waste incinerator ashes, paint chips or residues, catalyst matrixes, solid wastes such as municipal process residues, and biosludge from the bottoms of bioreactors or from the biotreatment of municipal wastes. The solid matrix can be in the form of an aggregate or can be in the form such as an intact solid, e.g., a solid surface.

In some instances, such solid matrixes contain such metals as lead, chromium, copper, zinc, cadmium, nickel, tin, aluminum, manganese, mercury, barium and actinide metals such as thorium, uranium, plutonium and americium as contamination. It may be desirable to decontaminate a solid matrix containing low to medium levels of one or more of these contaminants for proper waste management. The recovered metal may or may not be of value. The present process can also be used to selectively remove or separate metals of value from solid matrixes that contain metals such as copper, zinc, gold, silver, nickel, aluminum, platinum, palladium, rhodium, ruthenium and osmium, with recovery and marketing of such metals being desired.

In the process of the present invention, a water-soluble polymer capable of binding with the particular metal is contacted with a solid matrix to selectively remove metal (as metal ions) from the matrix and thereafter separated from the solid matrix. One manner of contacting a solid matrix, such as soil, mine tailings, or paint chips, with the water-soluble polymer is by, e.g., heap leaching, i.e., passing an aqueous solution of the water-soluble polymer one or more times through a pile or mound of the solid for a sufficient period of time to form a water-soluble polymer-metal complex, such a complex remaining within the aqueous solution which is then separated from the soil. Other modes of contacting the water-soluble polymer with a solid matrix can include: tumbling of the solid, such as soil, sludge, ash, catalyst or ore, with an aqueous solution of the water-soluble polymer; multiple flushing of the surface of a solid, e.g., the inside of pipes or tanks, with an aqueous solution of the water-soluble polymer; injection mining where an aqueous solution of the water-soluble polymer is injected into the ground through holes drilled into an ore body.

The water-soluble polymers useful in practicing the present invention are synthetic water-soluble polymers, i.e., they are not naturally occurring water-soluble polymers such as starch, cellulose, and the like and do not involve modified naturally occurring water-soluble polymers. The water-soluble polymers used in the present invention generally include a nitrogen-, oxygen-, or sulfur-containing group. Exemplary of the water-soluble polymers used in the present invention are polyalkyleneimines such as polyethyleneimine and modified polyalkyleneimines, i.e., polyalkyleneimines such as polyethyleneimine where the water-soluble polymer includes functionalization selected from the group consisting of carboxylic acid groups, ester groups, amide groups, hydroxamic acid groups, phosphonic acid groups, phosphonic ester groups, acylpyrazolone groups, aza-crown ether groups, oxy-crown ether groups, guanidium groups, thiolactam groups, catechol groups, mercaptosuccinic acid groups, alkyl thiol groups, and N-alkylthiourea groups. In addition to polyethyleneimine as the basic structure of many of the water-soluble polymers, other water-soluble polymer structures with nitrogen-containing groups such as poly (vinylamine), polyvinylpyridine, poly(acrylamide), and poly (allylamine), can be used. Also, water-soluble polymers structures with oxygen-containing groups such as poly (vinylalcohol) or oxygen- and nitrogen-containing groups such as polyvinylpyrrolidone can be used. The amine backbones can also be permethylated to give permethylpolyethyleneimine, permethylated polyvinylpyridine, permethylated polyallylamine, or permethylated polyvinylamine. Water-soluble polymers can be constructed from vinyl monomer polymerization reactions to give a number of groups, copolymer of acrylamide and bis-phosphonic esters and acids. Water-soluble polymers with metal binding properties can be obtained from ring-opening reactions, e.g., the treatment of polypyrrolidone with base or hydroxylamine.

Exemplary of suitable functionalized water-soluble polymers are the reaction product of polyethyleneimine and an arylalkylhaloacetylpyrazolones such as phenylmethylchloroacetylpyrazolone or dimethylchloroacetylpyrazolone to yield a phenylmethylacetylpyrazolone-substituted or dimethylacetylpyrazolone-substituted polyethyleneimine, the reaction product of polyethyleneimine (polyallylamine, polyvinylamine) and a halocarboxylic acid such as bromoacetic acid or chloroacetic acid to yield an amino-carboxylate-substituted polyethyleneimine (polyallylamine, polyvinylamine), the reaction product of polyethyleneimine (polyvinylamine, polyallylamine) and phosphorous acid and formaldehyde to give a phosphonic acid substituted polyethyleneimine (polyvinylamine, polyallylamine), the reaction of polyethyleneimine and a monohydroxamic acid of succinic acid to give a hydroxamic acid substituted polyethyleneimine, the reaction of polyethyleneimine with acrylamide or ethylacrylate to give an ester or amide substituted polyethyleneimine, the reaction of vinylalcohol with a crown alcohol to give an oxycrown substituted vinylalcohol, the permethylation of polyvinylpyridine or polyethyleneimine or polyvinylamine or polyallylamine to give the respective permethylated polymers, the ring opening of polypyrrolidone with hydroxylamine to give the hydroxamic acid polymer, the copolymerization of a beta-bisphosphonic acid or ester with acrylamide or acrylic acid to give a copolymer, the reaction of polyethyleneimine with a methylene substituted beta-bisphosphonic acid or ester to give a beta-bisphosphonic acid or ester polyethyleneimine, and the reaction product of polyethyleneimine and a haloacetylaza crown material such as a chloroacetylaza crown ether to yield an aza crown ether-substituted polyethyleneimine.

When the polyethyleneimine is functionalized, care must be taken to control the level of functionalization as solubility problems at certain pH values can exist depending upon the type of functional groups and backbone used. The water-soluble polymers used in the present process preferably maintains their water solubility over the entire pH range of, e.g., pH 1 to 14. Preferably, any polyethyleneimine used in the present invention includes primary, secondary and tertiary amines. Bisfunctionalization can be realized for primary nitrogens allowing for multidentate character of some of the chelating groups. The polyethyleneimine is a branched polymer, giving it a globular nature and high charge density which partly accounts for its uniqueness in the polyamine family of polymers. This highly branched character also allows for better binding site interactions with metal ions within the polymer. Other polyamines, i.e., polyvinylamine and polyallylamine, can be used as backbones, and are composed of all primary nitrogens, but they are linear polymers and if over functionalized can lead to insolubility in different pH ranges.

Use of pre-purified polymer, e.g., polyethyleneimine, has the advantage that reagents used in subsequent functionalization steps are not lost on low molecular weight polyethyleneimine that will be lost in subsequent purification of the functionalized polymers. Further, it gives an extra margin of assurity that there will be no polymer leakage, e.g., through any ultrafiltration stage, during the use of the polymers in the process. Specifically, pre-purified or sized polymer is critical at the stage of recovering or separating the metal from the water-soluble polymer-metal complex.

Combinations of water-soluble polymers can also be used. For example, a pair of water-soluble polymers each highly selective for a particular metal or a particular group of metals such as actinide metals can be used in combination to selectively simultaneously remove the desired targeted metals from the particular solid matrix. Thereafter, the water-soluble polymers may be selectively stripped of the respective metal or group of metals by, e.g., appropriate control of pH into a range whereat one polymer is stripped of its particular metal while the second water-soluble polymer retains its particular metal as a water-soluble polymer-metal complex.

Generally, the concentration of the water-soluble polymer in the solution contacted with the solid matrix is from about 0.001 percent by weight to about 25 percent by weight, more preferably from about 0.1 percent by weight to about 4 percent by weight. Use of higher concentrations of the water-soluble polymer can result in a lower flux or flow during an ultrafiltration stage.

After the solution containing the water-soluble polymer is contacted with the solid matrix for a sufficient period of time to form water-soluble polymer-metal complex, the solution can be separated from the solid matrix and the metal can then be separated from the water-soluble polymer-metal complex. Separation of the water-soluble polymer-metal complex is preferably accomplished by ultrafiltration. Ultrafiltration is a pressure driven separation occurring on a molecular scale. As a pressure gradient is applied to a process stream contacting the ultrafiltration membrane, liquid including small dissolved materials is forced through pores in the membrane while larger dissolved materials and the like are retained in the process stream.

In an ultrafiltration stage, the aqueous solution containing the water-soluble polymer-metal complex is passed to an ultrafiltration unit as shown in FIG. 1. Referring to FIG. 1, the process for displacing cyanide ion from the metal-cyanide complex by the water-soluble polymer includes the following steps: a metal-cyanide-containing feed solution is added via line 1 to a solution of the water-soluble polymer in tank 2. This reaction mixture is conveyed via line 3, pump 4, and line 5 to separations means 6. Generally, the separations means 6 preferably is an ultrafiltration membrane, having a MWCO less than the molecular weight of the water-soluble polymer. The separation is normally accompanied by recirculating the mixture through the membrane device having a throttle valve 7 in line 8 to maintain a pressure of less than 60 psi in the membrane unit with 25 psi being preferred. The aqueous solution which permeated through the membrane is collected as effluent 9 which contains the free cyanide. The cyanide can be destroyed or the cyanide solution reused.

Both the water-soluble polymer-metal complex and any free, i.e., uncomplexed, water-soluble polymer are optimally retained by the membrane of the ultrafiltration unit, i.e., they do not pass through the membrane as permeate, while the solvent, i.e., water, can pass through the membrane. The retention of solutes during ultrafiltration depends on the membrane pore size. The molecular weight cut-off (MWCO) is generally defined as the molecular weight of spherical, uncharged solute which is 90 percent retained by the membrane. Thus, both size and shape can influence the MWCO. By use of ultrafiltration, the water-soluble polymer-metal complex can be separated from the solution whereafter the metal can be separated from the water-soluble polymer-metal complex for recovery, recycling, or disposal as desired.

Figure 2:
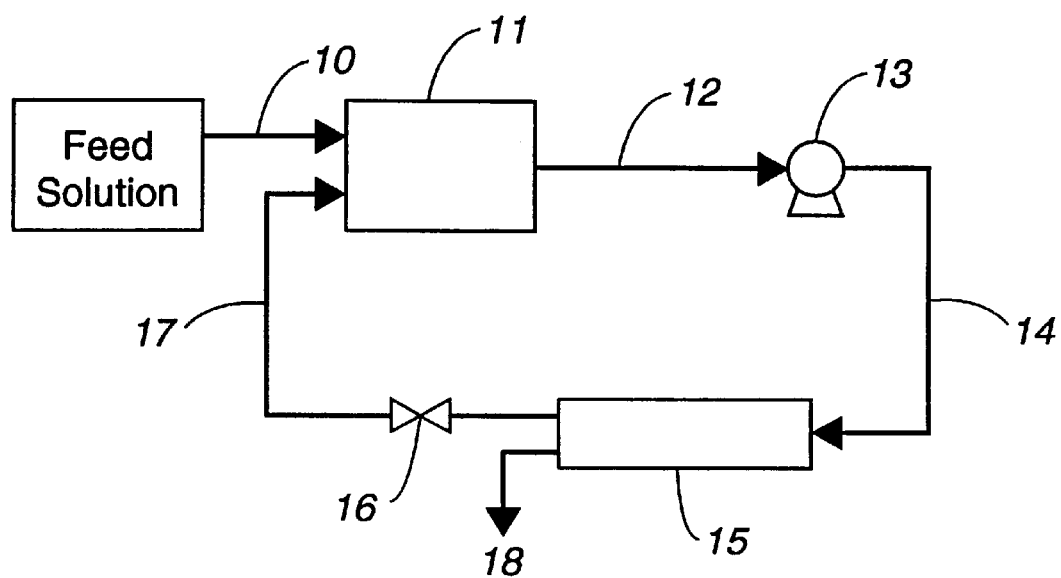
FIG. 2 illustrates a schematic diagram of an ultrafiltration process using a diafiltration mode of operation.

Generally, there are two modes of operation in ultrafiltration. The first is a batch or concentration mode, shown in FIG. 1, where the volume in the retentate is reduced by simple filtration. The second mode is diafiltration with the ultrafiltration unit as shown in FIG. 2. Referring to FIG. 2, the process for recovering metal-ions from the metal-loaded water-soluble polymer includes the following steps: a metal stripping solution, e.g., dilute mineral acid, is added via line 10 to a solution of the water-soluble polymer in tank 11. This reaction mixture is conveyed via line 12, pump 13, and line 14 to separations means 15. Generally, the separations means 15 preferably is an ultrafiltration membrane, having a MWCO less than the molecular weight of the water-soluble polymer. The separation is normally accompanied by recirculating the mixture through the membrane device having a throttle valve 16 in line 17 to maintain a pressure of less than 60 psi in the membrane unit with 25 psi being preferred. The aqueous solution which permeated through the membrane is collected as effluent 19 which contains the metal concentrate. The metal ions can be reused or treated for proper waste management.

During diafiltration, as permeate is generated, solute-free liquid, e.g., dilute mineral acid, or deionized water, is added to the retentate at the same rate as the permeate is separated thereby maintaining constant volume within the ultrafiltration unit. In diafiltration, the lower molecular weight species in solution are removed at a maximum rate when the rejection coefficient for the membrane equals zero.

In the present process, an ultrafiltration unit can generally consist of hollow-fiber cartridges of membrane material having a MWCO from about 1000 to 1,000,000, preferably from 10,000 to 100,000. Other membrane configurations such as spiral-wound modules, stirred cells (separated by a membrane), thin-channel devices and the like may also be used although hollow-fiber cartridges are generally preferred for the ultrafiltration unit. Among the useful ultrafiltration membranes are included cellulose acetate, polysulfone, and polyamide membranes such as polybenzamide, polybenzamidazole, and polyurethane.

The use of ultrafiltration for separations is further described in Kirk Othmer: Encyclopedia of Polymer Science and Engineering, 2nd Ed., vol. 17, pp. 75–104, 1989, such description incorporated herein by reference.

Generally, the water soluble polymers used in the present process have molecular weights of from about 1000 to about 1,000,000, preferably from about 10,000 to about 100,000. Above molecular weights of about 1,000,000, the polymers tend to lose solubility and thus are no longer water soluble, while below molecular weight of about 1000, retention by suitable ultrafiltration membranes can present problems.

The water-soluble polymers can be of the type described by Smith et al., in U.S. patent application Ser. No. 08/454,451 filed concurrently herewith, entitled "Water-Soluble Polymers" such description incorporated herein by reference.

The present invention is more particularly described in the following examples which are intended as illustrative only, since numerous modifications and variations will be apparent to those skilled in the art. Examples A–C show the preparation of a PEI and PEI derivatives used in the present process, while Examples 1–7 show the process of separating metals from a solid matrix.

EXAMPLE A

The polyethyleneimine (PEI) was prepared as follows. Crude polyethyleneimine (obtained from BASF as Polymin Waterfree PEI and as PEI homopolymer P) was obtained in two molecular weight ranges. The Polymin Waterfree polymer was reported to have a molecular weight in the range of 10,000 to 25,000, while the PEI homopolymer P was reported to have a molecular weight range of 70,000 to 750,000, depending upon the method of molecular weight measurement. In reality both of these polymer had a broad molecular weight range and had material that passed through ultrafiltration membranes that had 10,000 MWCO and 30,000 MWCO and 100,000 MWCO. These polymers from BASF were highly branched having a primary to secondary to tertiary nitrogen ratio of approximately 1:2:1.

The polyethyleneimine was diluted in water to approximately 10–15% by weight. The pH was about 10.5 upon dissolution of the polyethyleneimine. The solution was diafiltered using, e.g., a UFP-10-C-5 membrane, such membranes currently manufactured by AG Technologies, Corp. with 10,000 MWCO, 30,000 MWCO, and 100,000 MWCO, (keeping the volume constant) until 6–7 volume equivalents of water were passed through the system at less than or equal to 25 PSI. Following the diafiltration step, the solution volume was reduced approximately 85% to concentrate the polymer. The remaining water was removed under vacuum and mild heat to yield colorless, viscous purified polyethyleneimine. Thus, with polymin waterfree 25% by weight PEI came through the 10,000 MWCO membrane, 10% by weight PEI came through the 30,000 MWCO and not the 10,000 MWCO membrane, and 65% by weight was retained by the 30,000 MWCO membrane. With the Polymin P polymer 16% by weight passed through the 10,000 MWCO membrane, 3% by weight was less than 30,000 MWCO and greater than 10,000 MWCO, 5% by weight was less than 100,000 MWCO and greater than 30,000 MWCO, and 76% by weight was greater than 100,000 MWCO. The material resulting from the retentate from the 30,000 MWCO (hereinafter referred to as Polymer A1), when filtered on a 10,000 MWCO membrane, gave no detectable passage of the polymer through a 10,000 MWCO membrane using a copper test developed to detect less than 1 ppm of polyethyleneimine polymer. Similarly for material collected at greater than 100,000 MWCO (hereinafter referred to as Polymer A2) when tested on a 30,000 MWCO membrane no detectable polymer was observed in the permeate. For some applications the polymer concentrate did not require drying but could be concentrated to a workable volume as subsequent functionalization reactions were performed in water.

The copper test involved placing 0.5 mL of the test sample into a 10 mL volumetric flask, adding 0.5 mL of a copper acetate solution (1.99 g of copper acetate diluted to 100 mL with 0.01M HCl), 1.0 mL of pH 5.8 buffer (0.6 mL of acetic acid diluted to 100 mL with deionized water with addition of 11.2 g of anhydrous sodium acetate and sufficient sodium acetate or acetic acid to adjust pH to 5.8), and deionized water to dilute to mark. This solution was mixed well. A standard curve for an UV-VIS spectrophotometer was prepared using 0.01%, 0.02%, 0.05%, and 0.08 wt/vol % solutions of PEI. A reagent blank was used as a reference sample and read at 284 nanometers.

EXAMPLE B

A number of carboxylated polyethyleneimine polymers with different levels of carboxylations were prepared as follows. A solution of potassium hydroxide in water was added dropwise over a period of 30 minutes to a solution of polyethyleneimine (Polymin Waterfree) in water and bromoacetic acid in water keeping the temperature below 50° C. After the addition was complete the solution was stirred at reflux for 3 hours. The solution was cooled to room temperature, then diluted with 2 liters of deionized water. The pH of the solution was adjusted to 5.8 using potassium hydroxide or hydrochloric acid. The polymer was purified by diafiltration collecting five volume equivalents of permeate using hollow fiber cartridges (e.g., UFP-10-C-5 from AG Technologies, Corp.) with a 30,000 MWCO. The bulk of the water was removed under reduced pressure. The residual material was dried in a vacuum oven at 60° C. overnight to give a light tan brittle solid. The proportions used for each polymer prepared are given in Table 1 below.

TABLE 1

Conditions for preparation of polymers with different levels of carboxylate functionalization

| Polymer | KOH (gm)/ $H_2O$ (ml) | PEI (gm)/ $H_2O$ (ml) | BrHOAc (gm)/$H_2O$ (ml) | equivalents BrHOAc to PEI |
|---|---|---|---|---|
| Polymer B1 | 260.4/400 | 25/250 | 322.4/250 | 4 |
| Polymer B2 | 195.7/400 | 25/200 | 241.8/300 | 3 |
| Polymer B3 | 130.3/400 | 25/200 | 161.3/300 | 2 |
| Polymer B4 | 32.6/400 | 25/200 | 40.4/300 | 0.5 |

EXAMPLE C

A fully functionalized phosphonic acid containing water-soluble polymer was prepared on a polyethyleneimine (Polymin Waterfree from BASF, used as received, i.e., unpurified). Polyethyleneimine (2.50 g, about 0.058 mole monomer equivalent) was dissolved in 6M hydrochloric acid (80 mL) followed by the addition of solid phosphorous acid (19.0 g, 0.29 mole) at room temperature. The homogeneous solution was brought to reflux followed by the dropwise addition of formaldehyde (38 mL of a 37% solution, 0.47 mole) over a hour. After the addition was complete, the solution was stirred at reflux for an additional hour. The heat was removed and the flask allowed to sit overnight at room temperature. The sticky solid precipitate was collected by decantation of the liquid from the flask. The solid was dissolved in water adjusted to pH 6.8 with sodium hydroxide. The solution was purified by diafiltration through a 30,000 MWCO membrane (e.g., UFP-10-C-5 from AG Technologies, Corp.). A total permeate volume of 3.5 liters was collected. The solution was then concentrated to approximately 150 mL. After removing the water under reduced pressure, the residue was dried under high vacuum at 60° C. overnight to give 6.3 g of a light yellow solid. Elemental analysis found: C, 22.46%; H, 5.48%; N, 8.70%; P, 16.88%.

EXAMPLE 1

The water-soluble polymer polyethyleneimine from Example A and the carboxylate functionalized derivatives of PEI, Polymer B from Example B, were tested for the removal of lead from contaminated soils. The capacities for lead with the polymers prepared in Example B were determined by mixing 25 mL of a solution containing 200 ppm lead and 10 mg of the polymer and are shown in Table 2. The solution was then filtered using a stirred cell and a polysulfone ultrafiltration membrane with a 10,000 MWCO to retain the polymer. Unbound lead in the permeate was analyzed on a Varian Liberty 200 ICP-AES.

TABLE 2

Capacities for Polymers B1–3 and Polymer A for lead.

| Polymer | Pb capacity mg Pb/10 mg polymer |
|---|---|
| Polymer B1 | 4.0 to 4.7 |
| Polymer B2 | 3.6 |
| Polymer B3 | 1.2 to 1.8 |
| Polymer A | 4.7 |

Batch studies with soil samples were conducted. Two types of soil were tested. The first was a surrogate soil sample, i.e., uncontaminated soil intentionally contaminated to a controlled amount by the addition of a lead nitrate solution. The second was a weathered soil sample from Cal-West, a Superfund site in southern New Mexico where the soil has an average lead contamination of about 10,000 ppm lead. Lead-contaminated soil (0.5 g) was added to a centrifuge tube. To the tube was added 10 mL of polymer solution (0.5 wt/vol %). The pH was adjusted to about 6.5 to 7.5. The reaction mixture was rotated for 4 hours, then centrifuged, and the supernatant decanted and analyzed for lead using ICP-AES. Mass balances for the lead were carried out by digesting the soil using concentrated nitric acid in a CEM pressure-controlled microwave following EPA Method 3051 procedure. Leaching blanks with just water and soil gave nondetectable levels of lead ($\leq 1$ ppm) in the solution. The results are showed in Table 3.

TABLE 3

Results of extraction of lead for several soils with Polymer A, B4, and B1.

| Polymer | Excess polymer to lead | % Pb recovered Surrogate | Call-West |
|---|---|---|---|
| Polymer A | 20 times | 31 | 36–39* |
| Polymer B1 | 20 times | 85–100* | 85–88* |
| Polymer B4 | 20 times | 80 | 67–71* |

*multiple runs give range of removal effectiveness on different samples.

From the above results, it can be seen that while Polymer A1 and Polymer B have similar lead loading capacities, the ability of Polymer A to remove lead from contaminated soils is consistently about 40% that of Polymer B. This may be related to the selectivity of the polymers. In the loading capacity study lead is the only metal present, while other metals are present in soil, some in great concentrations. It was found that while Polymer B1 effectively binds and removes lead from soil, it does not remove significant amounts of iron which was present at much greater concentrations. Further, it was found that the binding and removal of lead by polymer B4 works effectively at pH values in the neutral range of 6 to 8, and polymer B1 can also bind and remove lead in soils even up to pH 12.

EXAMPLE 2

Test of water-soluble polymers for removal of lead and other potentially interfering metal ions from contaminated soils: Polymer B4 was used as a 0.45 wt/vol % solution and polymer B1 was used as a 0.35 wt/vol % solution in contact with 0.5 gm of soil (Cal-West) for 24 hours. After extraction, the extraction solution was separated from the soil by centrifugation and the metals in solution analyzed by ICP-AES. The results are reported in Table 4 and the percentage extracted from the soil sample is relative to the total amount of metal in the soil.

TABLE 4

Results of extraction of soil with Polymer B1 and B4.

| Element | Polymer B1, % Bound | Polymer B4, % Bound |
|---|---|---|
| lead | 100 | 97 |
| calcium | 27 | 10 |
| iron | 0.6 | 0.4 |
| magnesium | 5 | 4 |

As calcium is present in large amounts (>30,000 ppm) in moist soils and frequently present as highly soluble salts, it is not surprising that significant quantities leached from the soil. While small amounts of iron and magnesium were also extracted from the soil, no significant amounts of any other metals were detected in the extraction solution that was analyzed.

EXAMPLE 3

A solution of a water-soluble polymer was used to leach soil to below toxic levels. Polymer B1 prepared as in Example B was tested in a successive batch procedure for the removal of lead from contaminated soils to less than 5 ppm Pb under TCLP methodology. A soil sample (0.5 gm) was sequentially extracted under batch conditions as in Example 1 using 10 mL of fresh Polymer B1 solution (0.5 wt/vol %) each time for 4 hours for each batch. After the fourth extraction, the soil sample passed the TCLP for lead. A repeat of this study wherein the rotation time of the samples was increased to 24 hours resulted in the soil passing TCLP after a single 24 hour extraction. With four 24-hour extractions, the level of lead in the soil was reduced to about 500 ppb.

EXAMPLE 4

A solution of a water-soluble polymer was used to leach metal ion from a catalyst. Zeolytic catalyst (0.2 g, ZSM-5) obtained from Englehart loaded with copper (0.28 wt %) was stirred with 10 mL of a 0.5 wt/vol % solution of Polymer B4 for a period of 24 hours at room temperature. Following a single pass or contact period, greater than 83% of the copper was found to have been removed or extracted from the catalyst as determined by ICP-AES.

EXAMPLE 5

A water-soluble polymer was used to leach toxic metal ions from paint chips. A sample of pale green paint peeling from the interior walls of an approximately 40 year old building was broken into approximately ¼ inch pieces for extraction. A 0.2 g sample of the paint, which contained lead, chromium and zinc was extracted with 10 ml of a 0.5 wt/vol % solution of Polymer B4. Initial metal concentrations were Pb 0.45 wt %, Cr 0.03 wt % and Zn 0.3 wt. % in the paint. After a single 24 hour contact period, 4.5% of the lead, 35.4% of the Cr and 31.4% of the Zn were found to have been removed or extracted from the paint as determined by ICP-AES. These levels of removal suggest that size reduction of the paint scrapings by e.g., grinding may be necessary to improve removal of the metals.

EXAMPLE 6

A water-soluble polymer was used to leach actinides from soil. A sample of uranium contaminated soil from the Fernald uranium processing site in Ohio was sieved to <2 mm particle size, air-dried at 30° C. and ball-milled for uniformity. The total U-238 content of the soil was 465 ppm by Atomic Absorption. Three polymers were used to leach the soil, Polymer A1, Polymer B1, and Polymer C. The soil (0.5 g) in 10 mL of polymer solution (0.07 wt/vol %) were contacted for 24 hour at room temperature. Under these conditions, Polymer A removed 1.5% of the total U, Polymer C removed 10.4% of the total U and Polymer B1 removed 7.1% of the total U. The experiments were repeated with sodium dithionite (100 nanomolar(nM)) added as a reductant. Soils were extracted for 72 hours. Under these conditions, removal by Polymer A did not improve, Polymer C removed 28% of the total U and Polymer B1 removed 29.1% of the total U in the single pass extraction.

EXAMPLE 7

A solution of a water-soluble polymers was used in the recovery of metals from ore samples. The water-soluble polymer polyethyleneimine, Polymer A, was tested for the removal of copper from a copper ore deposit in rock. A 100 mL solution of Polymer A (4 wt/vol %) was contacted with the rock (20.7 g) containing copper deposits (from the Copper Queen mine in Bisbee, Ariz.). Agitation was provided by magnetic stirring for a 24 hour period at which time the polymer solution was decanted and fresh polymer (100 mL, 4 wt/vol %) added. After an additional 48 hours the two solutions were combined and analyzed for copper resulting in a concentration of 203 ppm. The total amount of copper extracted from the rock was 71 mg or about 0.4% by weight. As a measure of the efficiency of copper removal from the first two solutions, the rock was subsequently crushed and leached for additional copper using a Polymer A (100 mL, 4 wt/vol %) solution. Analysis of this second solution, after 24 hours of contact, yielded only an additional 8.6 mg. Total copper removed was 78.6 mg. Analysis of the solutions for iron gave 0.9 mg of iron leached from the combined first two solutions and 0.6 mg in the second solution. Based on the above results, the polymer shows the ability to extract copper from ore not only in a selective manner, but was also able to effectively extract a significant percentage of the copper from the rock without the need for crushing.

Although the present invention has been described with reference to specific details, it is not intended that such details should be regarded as limitations upon the scope of the invention, except as and to the extent that they are included in the accompanying claims.

What is claimed is:

1. A method of selectively separating a target metal contained in a solid matrix from the solid matrix comprising:
   contacting a solid matrix containing a target metal with an aqueous solution including a water-soluble polymer adapted for binding with the target metal for sufficient time whereby a water-soluble polymer-target metal complex is formed;

separating the solution including the water-soluble polymer-target metal complex from the solid matrix;

separating a concentrated aqueous solution of the water-soluble polymer-target metal complex from the aqueous solution by ultrafiltration; and, separating the target metal from the water-soluble polymer-target metal complex and recovering the water-soluble polymer.

2. The method of claim 1 further including recovering the target metal from the solution including the water-soluble polymer-target metal complex by separating the target metal from the water-soluble polymer-target metal complex.

3. The method of claim 1 wherein the target metal is selected from the group consisting of lead, cobalt, mercury, barium, cadmium, strontium, cesium, nickel, copper, chromium, manganese, uranium, thorium, plutonium, americium, and technetium.

4. The method of claim 1 wherein the target metal is lead.

5. The method of claim 1 wherein the target metal is selected from the group consisting of tin, gold, silver, zinc, copper, palladium, platinum, osmium, ruthenium, and rhodium.

6. The method of claim 1 wherein the target metal is mercury.

7. The method of claim 2 wherein the target metal is selected from the group consisting of lead, cobalt, mercury, barium, cadmium, strontium, cesium, nickel, copper, chromium, manganese, uranium, thorium, plutonium, americium, and technetium.

8. The method of claim 2 wherein the target metal is selected from the group consisting of tin, gold, silver, zinc, copper, palladium, platinum, osmium, ruthenium, and rhodium.

9. The method of claim 2 wherein the target metal is lead.

10. The method of claim 2 wherein the target metal is mercury.

11. The method of claim 2 wherein the solid matrix is soil.

12. The method of claim 2 wherein the solid matrix is a catalyst.

13. The method of claim 1 wherein solid matrix is a paint.

14. The method of claim 12 wherein solid matrix is a metal-bearing ore.

15. The method of claim 1 wherein solid matrix is a solid surface.

16. The method of claim 1 wherein a reductant or oxidant can be used to treat the solid matrix prior to treatment with the water-soluble polymer.

17. The method of claim 13 wherein the target metals are lead and chromium.

18. The method of claim 14 wherein the target metals are selected from the group consisting of copper, zinc, gold, silver and nickel.

19. The method of claim 12 wherein the target metals are selected from the group consisting of copper, platinum, rhodium, osmium, palladium and ruthenium.

20. The method of claim 1 wherein at least two different water-soluble polymers are used.

* * * * *